Nov. 3, 1942.　　　　E. S. MARIOTTE　　　　2,300,457
AUTOMATIC STOCK BAR FEED MECHANISM FOR AUTOMATIC SCREW MACHINES
Filed Sept. 24, 1940　　　2 Sheets-Sheet 2
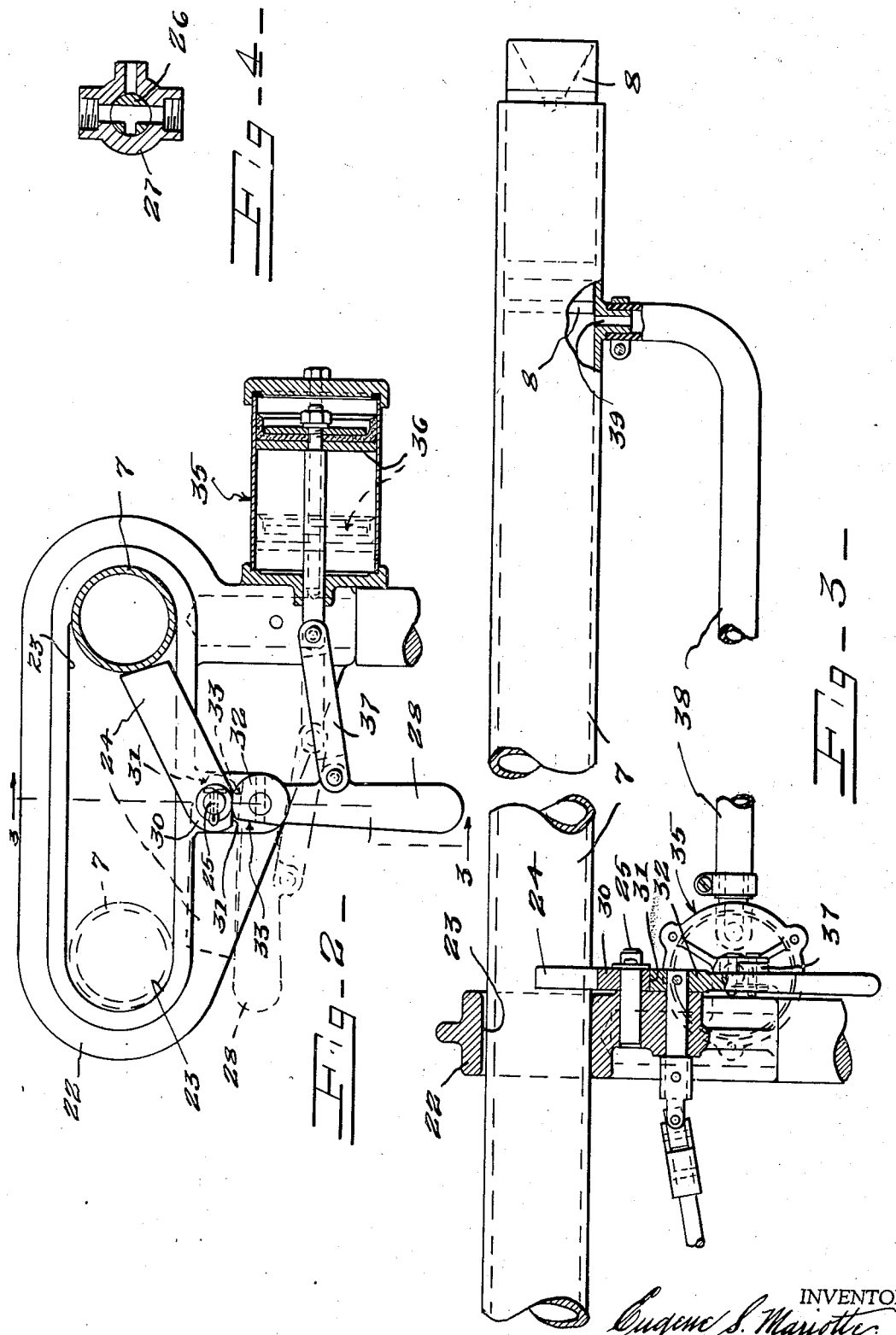
INVENTOR.
Eugene S. Mariotte
BY
Bodell & Thompson
ATTORNEYS.

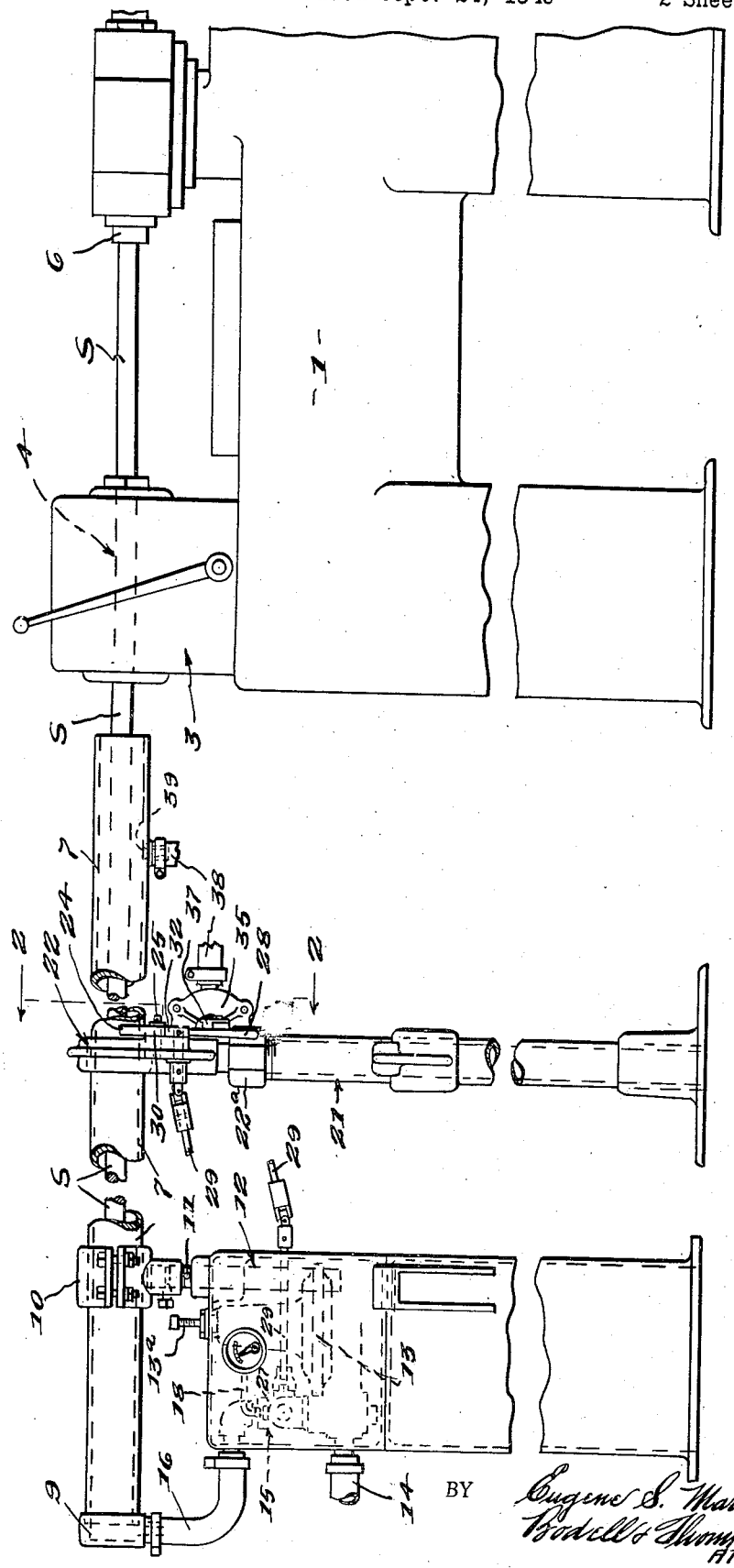

Patented Nov. 3, 1942

2,300,457

UNITED STATES PATENT OFFICE 2,300,457

AUTOMATIC STOCK BAR FEED MECHANISM FOR AUTOMATIC SCREW MACHINES

Eugene S. Mariotte, North Syracuse, N. Y., assignor to W. C. Lipe, Inc., Syracuse, N. Y., a corporation of New York Application September 24, 1940, Serial No. 358,166

2 Claims. (Cl. 29—59)

This invention relates to stock bar feed mechanism for automatic machine tools or automatic screw machines, which mechanism embodies a plunger movable in a tube or cylinder to which a motive fluid, as air, is supplied to actuate the plunger to feed the stock bar against the stop of the machine tool or screw machine.

It has for its object a means for cutting off the supply of motive fluid, or air, to the cylinder when the plunger has traveled a predetermined distance, this distance being that traversed by the plunger when a new stock bar is being inserted in the tube.

It further has for its object an interlocking means between the operating connections for the valve which controls the flow of air to the tube or cylinder, and a locking device which prevents displacement of the tube out of normal position, the locking device preventing opening of the valve, except when the tube is in its normal or operative position or permitting displacement of the tube out of normal position only when the valve is closed. The tube is shiftable out of its normal or operative position to permit the insertion of a new stock bar in the tube.

The invention is shown as applied to the machine of my pending application, Serial Number 353,545, filed August 21, 1940.

The invention consists in the novel features and in the combinations and constructions hereinafter set forth and claimed.

In describing this invention, reference is had to the accompanying drawings in which like characters designate corresponding parts in all the views.

Figure 1 is an elevation, partly in section, of a feeding mechanism embodying this invention, the screw machine with parts omitted being also shown.

Figure 2 is an enlarged sectional view on line 2—2, Figure 1.

Figure 3 is a fragmentary sectional view taken on the plane of line 3—3, Figure 2.

Figure 4 is a sectional view of the two-way valve in the control system of the feed mechanism.

I designates the machine tool, automatic metal working or screw machine having a head 3 formed with a passage 4 through which the stock bar S is fed to the tools, not shown, of the machine. 6 designates the stop against which the stock bar is fed after each operation preliminary to the next operation, it being understood that the bar is fed against the stop and a portion thereof operated on by the tool, the machined or finished article cut off, and the bar again fed up against the stop, and that this operation is repeated until the stock bar is used up or nearly used up.

The feed mechanism includes a cylinder or tube 7 for receiving the stock bar, this being normally mounted in alinement with the passage 4 and a feed plunger 8 movable in the tube, and a system for controlling the flow of motive fluid to the cylinder including a control valve. The tube is closed at its end remote from the end through which the stock bar S is fed, forming a cylinder for a motive fluid, as compressed air. Also, the tube is mounted to shift out of alinement with the passage 4 in order to be reloaded with a new stock bar, the tube being here shown as shiftable radially or laterally. The tube is here shown as carried by a collar or bracket 10 mounted to rock or swivel about a stem 11 threading into the top of a housing 12. The stem 11 is threaded for the purpose of effecting a vertical adjustment of the tube in order to aline the tube in a horizontal plane of the passage 4.

13 designates a pressure chamber of a compressed air system, the chamber 13 being located within the housing or base 12 and connected through a pipe 14 to a suitable source of compressed air. The pressure chamber communicates through a valve controlled conduit 15 with a flexible pipe or hose 16 which communicates with the tube 7 through the head 9. A pressure gage communicates through a pipe 18 with the conduit 15 between the valve therein and the conduit 16, in order to indicate the pressure in the tube 7. The pressure chamber embodies a valve to regulate the pressure delivered to the conduit 15, and hence to the tube 7. The valve is operable to adjust the pressure by means, as a screw 13ª. The construction of the chamber 13 and its regulating valve per se forms no part of this invention. The chamber 13, conduit 15, pressure gage and connections are all grouped together within the housing 12. The overhanging end or portion of the tube between the bracket 10 and the machine 1 is supported to have a vertical adjustment. The overhanging portion is here shown as carried by a standard 21 at the upper end of which is carried a bracket 22 provided with a laterally extending slot 23 through which the tube 7 extends, the slot permitting radial shifting of the tube into and out of alinement with the passage 4. The bracket 22 is adjustable vertically relatively to the standard by a nut 22ª, in order to adjust the height of the tube 7. The tube is normally alined with the passage 4 and is preferably locked in this position by a lock or latch 24 (Figure 2). When it is desired to put a new stock bar in the tube, the latch 24 is released and the tube 7 swung out of the position shown in Figure 2 along the slot 23 into the dash line position (Figure 2). In order to prevent unlocking operation and the swinging of the tube 7 out of its normal position, when the valve in the pipe 15 is open, one interlock is provided by which the latch 24 can not be unlocked until the air behind the plunger 8 has been released, that is, until the valve in the conduit 15 is closed.

In the illustrated embodiment of my invention, the lock 24 is pivoted at 25 to the bracket 22 and swings about its pivot from the full line position to the dash line position, but is held from being unlocked while the valve in the pipe 14 is open.

26 designates the movable member of a two-way valve mounted in a casing 27, which casing is connected in the pipe or conduit 15. The valve member 26 is normally operated by a handle 28 mounted on the bracket 22 and connected through a flexible shaft 29 to the movable valve member. The handle 28 and the lock 24 are so formed that the handle prevents pivotal movement of the lock 24, when the handle is in its position occupied when the valve 26 is open, and permits shifting of the lock 24 out of locking position, when the handle 28 is operated to close the valve 26, the position of the handle 28, when the valve is open, being indicated in full lines (Figure 2), and when closed, in dash lines. As here shown, the hub 30 of the lock is provided with a peripheral cut-out or flat surface 31 which receives the hub 32 of the handle 28 when the valve is in closed position, and also when the lock 24 is in its locking position, and the hub 32 of the handle 28 is provided with a similar flat peripheral surface or cut-out 33 arranged to be brought into juxtaposition to the hub 30 when the handle 28 is turned to close the valve 26. Thus, the tube 7 is held locked in its normal position by reason of the cut-out 31 of its hub interlocking with the periphery of the hub of the handle 28. Upon turning of the handle 28 to close the valve 26, the cut-out 33 of the handle registers with the cut-out 31 so that the lock 24 can be then swung on its pivot out of locking position, and the tube shifted laterally out of alinement with the passage 4. When in this position, the handle is locked from being turned to open the valve until the latch 24 is returned to its locking position. It can not be turned to its locking position, until the tube 7 has also been returned to its normal position, because the tube when in its shifted position, blocks the return movement of the lock 24.

The construction thus far described is substantially the same as in my pending application referred to.

The subject matter of this invention is means controlled by the plunger after it has traveled a predetermined distance in the tube 7 to automatically cut off the flow of air to the tube or cylinder 7 and correlated with the valve operating connections or the member or handle 28 and locking mechanism or device 24 to permit opening of the valve only when the tube 7 is in alinement with the passage 4. This automatic means comprises a pressure or air operated motor, the movable member of which is connected to the valve operating connections, this motor being connected to the tube 7 through a conduit arranged to be uncovered by the plunger 8 when the plunger has traveled a predetermined distance, as seen in Figure 3. The plunger uncovers the port when the stock bar is too short to be fed further and a new stock bar is to be inserted.

The motor is here shown as of the cylinder and piston type including a cylinder 35, a piston 36 movable in the cylinder and connected through a link 37 to the handle or member 28 of the valve operating connections. The cylinder is connected on the pressure side of the piston to a feed conduit 38 which communicates with a port 39 in the tube 7 and located in such a position as to be uncovered or passed by the plunger, when the plunger has been fed to the limit of its movement, so that when the port 39 is uncovered by the plunger, the air pressure behind the plunger passes through the pipe 38 to the cylinder 35 and actuates the piston 36 therein, moving the member 28 to close the valve or into nearly or into the dash line position (Figure 2). When in this position, the locking device 24 can be swung from the full line position (Figure 2) to the dash line position and the tube 7 shifted laterally from the full line position to the dash line position. The tube, when in its shifted position, blocks the return of the locking device 24 to locking position until the tube 7 is shifted back into alinement with the passage 4 of the head 3 of the screw machine. The valve can then be opened by manual operation of the handle 28.

When a new bar is inserted, the plunger is pushed by the bar back toward the head end of the tube or cylinder, so that upon the manual return of the handle 28 to the full line position (Figure 2), the air on the pressure side of the piston 36 can exhaust back out through the pipe 38. The valve 26 in the conduit 15 is a two-way or combined intake and exhaust valve, and when in closed position, permits the air to exhaust back out of the tube 7.

The general operation is as follows:

During the repeated operations of the automatic metal working machine, the stock bar is fed in the tube step by step by the air pressure behind the plunger 8. When the stock bar is nearly used up, the plunger uncovers the port 39 permitting the air to enter the cylinder 35 and actuate the valve operating connections to close the valve in the conduit 15. This closing of the valve operates the interlock between the latch or lock 24 and the hub of the handle 28, so that the latch or lock 24 can be moved to unlocked or dash line position (Figure 2) and the tube 7 can then also be swung out of alinement with the passage 4 into the dash line position (Figure 2). A new bar is then inserted in the tube. The tube is then swung back into alinement with the passage 4 and the lock or latch 24 then moved into locked position, this operation permitting the handle 28 to be operated to again open the valve in the conduit 15.

What I claim is:

1. In an automatic stock bar feed for automatic metal working machines, the combination with a feed tube closed at one end forming a cylinder, a push plunger movable in the tube, means for supplying pressure to the closed end of the tube behind the plunger to actuate the plunger to feed the bar, a pressure system for supplying a pressure fluid to the closed end of the cylinder including a control valve; of automatic means controlled by the position of the plunger in the cylinder operable to close the valve when the plunger has traveled a predetermined distance, the automatic means including a pressure operated motor including a movable member, and a conduit connection between the motor and the cylinder and opening into the cylinder through a port located to be passed by the plunger when the plunger has traveled a predetermined distance, and motion transmitting means between the movable member of the motor and the valve.

2. In an automatic stock bar feed mechanism for automatic metal working machines having a passage for the stock bar, the combination with a feed tube normally alined with said passage and being closed at its end remote through which the stock bar is fed providing a cylinder, a plunger movable in the tube, and a system for supplying a pressure fluid to the closed end of the tube for actuating the plunger including a valve, operating connections for the valve, said tube being mounted to shift out of alinement with said passage; of means controlled by said operating connections for permitting opening of the valve only when the tube is in its normal position, a pressure operated motor including a movable member operatively connected to said connections to actuate the same to close the valve, and a conduit connecting the motor to the cylinder through a port arranged to be uncovered by the plunger when the plunger has traveled a predetermined distance.

EUGENE S. MARIOTTE.